United States Patent
Chen

(10) Patent No.: US 9,129,163 B2
(45) Date of Patent: Sep. 8, 2015

(54) DETECTING COMMON GEOGRAPHIC FEATURES IN IMAGES BASED ON INVARIANT COMPONENTS

(75) Inventor: Xin Chen, Evanston, IL (US)

(73) Assignee: HERE Global B.V., Veldhoven (NL)

( * ) Notice: Subject to any disclaimer, the term of this patent is extended or adjusted under 35 U.S.C. 154(b) by 765 days.

(21) Appl. No.: 12/490,575

(22) Filed: Jun. 24, 2009

(65) Prior Publication Data

US 2010/0328462 A1 Dec. 30, 2010

(51) Int. Cl.

| H04N 7/18 | (2006.01) |
| G06K 9/00 | (2006.01) |
| B60R 1/00 | (2006.01) |
| G01B 11/02 | (2006.01) |
| G06F 17/30 | (2006.01) |
| G01S 17/02 | (2006.01) |
| G06T 17/05 | (2011.01) |

(52) U.S. Cl.
CPC ............ *G06K 9/00818* (2013.01); *B60R 1/00* (2013.01); *G01B 11/022* (2013.01); *G06F 17/30247* (2013.01); *G06K 9/00798* (2013.01); *H04N 7/18* (2013.01); *H04N 7/181* (2013.01); *G01S 17/023* (2013.01); *G06T 17/05* (2013.01)

(58) Field of Classification Search
CPC .......... B60R 1/00; G01B 11/022; H04N 7/18; H04N 7/181; G01S 17/023; G05K 9/6202; G06T 17/05
USPC ................. 348/148, 135, 142–143, 136–137; 382/219, 113, 220, 190, 209, 103–104
See application file for complete search history.

(56) References Cited

U.S. PATENT DOCUMENTS

| 4,812,904 | A | * | 3/1989 | Maring et al. ................. 348/135 |
| 6,453,056 | B2 | | 9/2002 | Laumeyer et al. |
| 6,711,293 | B1 | * | 3/2004 | Lowe ............................. 382/219 |
| 6,937,747 | B2 | * | 8/2005 | Culp et al. .................... 382/113 |
| 6,965,685 | B1 | | 11/2005 | Smith |
| 7,149,356 | B2 | * | 12/2006 | Clark et al. ................... 382/209 |
| 7,672,543 | B2 | | 3/2010 | Hull et al. |
| 8,027,514 | B2 | | 9/2011 | Takaki et al. |

(Continued)

OTHER PUBLICATIONS

Zuiderveld, Karel, *Graphics Gems*, VIII.5-Contrast Limited Adaptive Histogram Equalization, pp. 474-485, ISBN 0-12-336155-9 (1994).

(Continued)

*Primary Examiner* — Shawn An
(74) *Attorney, Agent, or Firm* — Lempia Summerfield Katz LLC

(57) ABSTRACT

Systems, devices, features, and methods for detecting common geographic features in images, such as, for example, to develop a navigation database are disclosed. For example, a method of detecting a common text pattern, such as for a road or path sign, from collected images includes collecting a plurality of images of geographic areas along a road or path. An image of the plurality of images is selected. Components that correspond to an object about the road or path in the selected image are determined. In one embodiment, the determined components are independent or invariant to scale of the object. The determined components are compared to reference components in a data library. If the determined components substantially match the reference components, the object in the selected image is identified to be a common pattern, such as for a standard road or path sign, corresponding to the reference components in the data library.

18 Claims, 5 Drawing Sheets

(56) References Cited

U.S. PATENT DOCUMENTS

| | | | |
|---|---|---|---|
| 8,184,859 B2 | 5/2012 | Tanji | |
| 2007/0140595 A1 | 6/2007 | Taylor et al. | 382/310 |
| 2007/0189612 A1 | 8/2007 | Takahashi et al. | |
| 2008/0197284 A1 | 8/2008 | Ebenstein et al. | |
| 2009/0070031 A1 | 3/2009 | Ginsberg | |
| 2009/0074249 A1 | 3/2009 | Moed et al. | |
| 2009/0169055 A1 | 7/2009 | Ishikawa | |
| 2009/0228204 A1* | 9/2009 | Zavoli et al. | 701/208 |
| 2010/0172542 A1* | 7/2010 | Stein et al. | 382/103 |
| 2010/0292886 A1* | 11/2010 | Szczerba et al. | 701/29 |

OTHER PUBLICATIONS

Coughlan Lab, Applications for Visual Impairments, Applications of Computer Vision for the Blind and Visually Impaired, pp. 1-3, http://www.ski.org/Rehab/Coughlan_lab/General/ApplicationsForVisualImpairments.html (Aug. 2007).

Applied Media Analysis, Inc., Mobile Vision Technologies, pp. 1-2, http://www.appliedmediaanalysis.com/technologies.htm (2007).

Detecting Text from Natural Scenes, pp. 1-2, http://www.cs.cmu.edu/~yang/projects/text_det.html, (2006).

Yang, J., Interactive Systems Laboratories: Road Signs, Detection of Text on Road Signs from Video, pp. 1-2, http://www.isl.ira.uka.de/projects/current_projects/road_signs/ (viewed on Jan. 12, 2010).

The Blindsight Corporation, pp. 1-3, http://www.blindsight.com/about/ (2009).

Manual on Uniform Traffic Control Devices (MUTCD)—FHWA, U.S. Department of Transportation, Federal Highway Administration, pp. 1-2, http://www.mutcd.fhwa.dot.gov/ (2009).

Se, Stephen, *Zebra-crossing Detection for the Partially Sighted*, pp. 1-7, http://stephense.com/research/papers/cvpr00.pdf (2000).

Lowe, David G., *Object Recognition from Local Scale-Invariant Features*, pp. 1-8, http://people.cs.ubc.ca/~lowe/papers/iccv99.pdf (1999).

Lowe, David G., *Distinctive Image Features from Scale-Invariant Keypoints*, pp. 1-28, http://people.cs.ubc.ca/~lowe/papers/ijcv04.pdf (2004).

SignCAD, pp. 1-5, http://www.signcad.com/about/php (viewed on Jan. 12, 2010).

Felzenszwalb, et al., *Efficient Graph-Based Image Segmentation*, pp. 1-26, http://people.cs.uchicago.edu/~pff/papers/seg-ijcv.pdf (2004).

Valluri, Adityagiri, *Navigation and Mapping Through Automated Image Understanding and Retrieval*, The Pennsylvania State University, The Graduate School, Department of Electrical Engineering, A Thesis in Electrical Engineering, title page-p. 97 (May 2009).

Di Stefano, et al., *An Efficient Algorithm for Exhaustive Template Matching based on Normalized Cross Correlation*, Proceedings of the 12$^{th}$ International Conference on Image Analysis and Processing (ICIAP'03), pp. 1-6, (2003).

Wu et al., 3D Model Search and Pose Estimation from Single Images Using VIP Features, Jun. 2008, Computer Vision and Pattern Recognition Workshop.

\* cited by examiner

DETECTING COMMON GEOGRAPHIC FEATURES IN IMAGES BASED ON INVARIANT COMPONENTS

REFERENCE TO RELATED APPLICATIONS

The present patent application is related to the copending patent applications filed on the same date, Ser. No. 12/490,538, entitled "DETECTING GROUND GEOGRAPHIC FEATURES IN IMAGES BASED ON INVARIANT COMPONENTS," and Ser. No. 12/490,555, entitled "DETECTING GEOGRAPHIC FEATURES IN IMAGES BASED ON INVARIANT COMPONENTS," the entire disclosures of which are incorporated by reference herein.

BACKGROUND OF THE INVENTION

The present invention relates to analyzing image data and, more particularly, to detecting geographic features in collected images.

Geographic features, such as road signs or road markings, are prevalent in today's society. For example, when a person drives or walks to work or other destination, he or she usually encounters a traffic or road sign, such as a speed limit sign, or marking on a road. Cognizance of such geographic features helps in navigating throughout various areas as well as helps in maintaining order and safety for one's self and others.

Navigation systems or devices, for example, provide identification and/or location of geographic features to assist users. For example, a navigation device may display a data model of a road object or may provide instructions corresponding or related to a geographic feature. Such displays and/or instructions help an end user in navigation as well as make an end user aware of geographic features that he or she may be approaching.

For navigation systems or other devices to provide information of geographic features, data of the geographic features, such as location and type data, are associated or included with or in the systems or devices. However, collecting, detecting, and/or identifying such geographic features or data thereof may be a significant undertaking. For example, collection and/or identification of data about roads or paths in a geographic area and developing useful geographic feature data for navigation systems or other systems may be time consuming and/or intricate.

SUMMARY OF THE INVENTION

According to one aspect, a method of detecting a common text pattern, such as for a road or path sign, from collected images is disclosed. For example, the method includes collecting a plurality of images of geographic areas along a road or path. An image of the plurality of images is selected. Components that correspond to an object about the road or path in the selected image are determined. In one embodiment, the determined components are independent or invariant to scale of the object. The determined components are compared to reference components in a data library. If the determined components substantially match the reference components, the object in the selected image is identified to be a common pattern, such as for a standard road or path sign, corresponding to the reference components in the data library.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
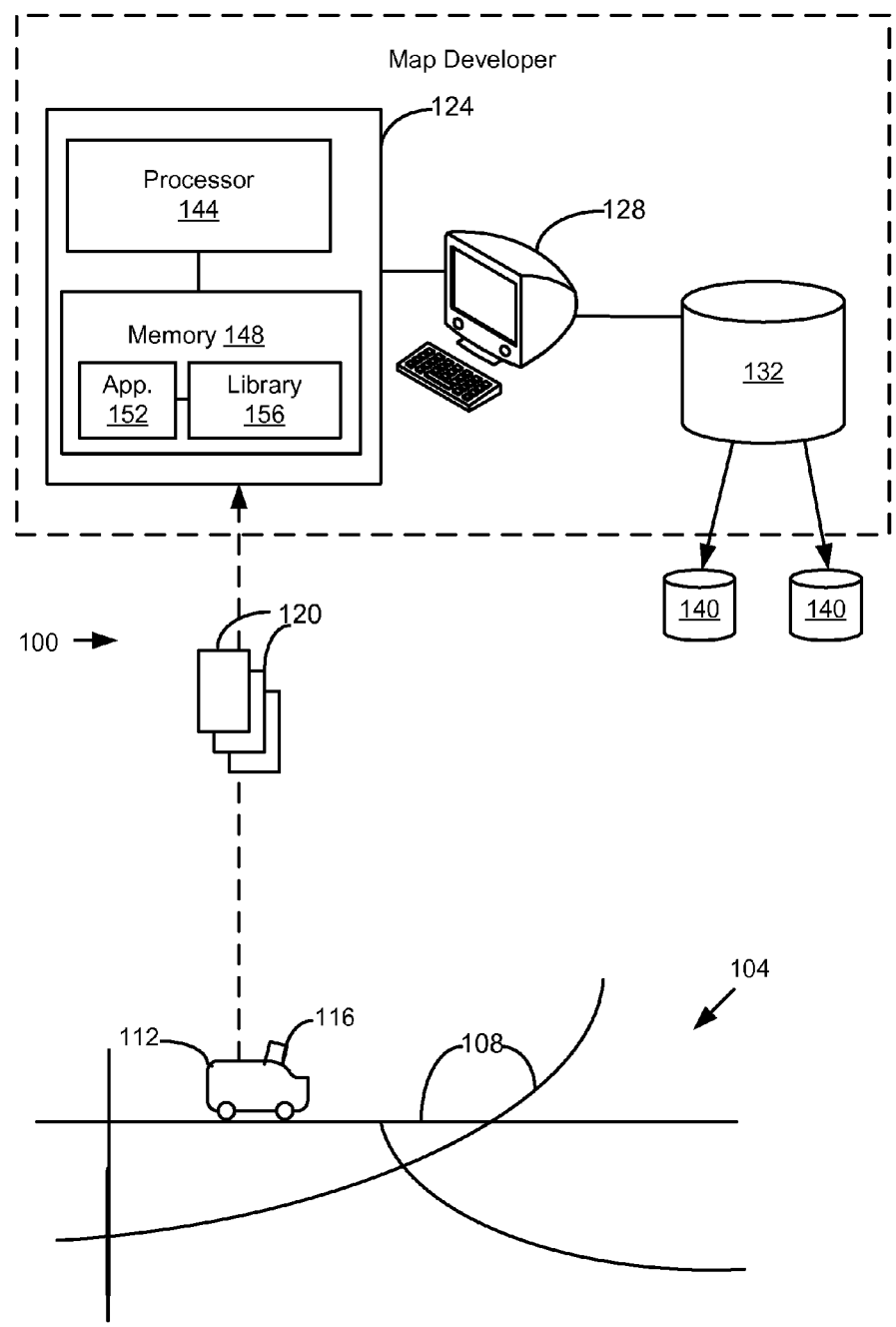
FIG. 1 is a diagram of a system for detecting a common geographic feature in images to develop a navigation database.

FIG. 1 shows one embodiment of a system 100 for detecting one or more geographic features, such as a common geographic feature (e.g., a common road sign or common text pattern thereof), in images to develop a navigation database. The system 100 includes, but is not limited to, an object 112 travelling on a path network 108 in a geographic region 104, a processing device 124, a user interface or work station 128, and a geographic, map, navigation, and/or navigation-related database 132. Additional, fewer, or different components may be provided.

The object 112 is a vehicle, such as a car, truck, motorcycle, bicycle, Segway, or other transportation device or mechanical device used to move on the path network 108. Alternatively, the object 112 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in a geographic region 104, such as a city, a suburb, a state, a country, and/or other geographic region.

The object 112 travels along or moves about the path network 108 to collect data associated with one or more paths or roads of the path network 108. For example, a supporting device or housing 116 is attached or connected with or carried by the object 112. The supporting device 116 may be or may include equipment to collect data representing an area about or around a road or path. For example, the collected data may be imagery or video/camera data (such as in the visible spectrum or other spectrum). In one embodiment, the supporting device 116 is a housing or container that is attached to a vehicle, and as the vehicle is on and/or moving on a road, equipment, such as a video and/or photograph camera, in the supporting device 116 collects or gathers data corresponding to the surrounding area. Alternatively, the supporting device 116 may be the camera itself or parts thereof. The supporting device 116 may be positioned at a frontend of the vehicle and may be angled to enhance collection. In other embodiments, the supporting device 116 may be positioned any place on the vehicle and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, photographs (such as digital or electronic photographs), video images, and/or other image data collected by the object 112 is stored in one or more media 120. Alternatively, the media 120 may be signals carrying or having image data. The collected image data or images may represent areas or regions about or around a path or road. The collected images may include geographic features, such as road or path markings, road or path signs (such as a speed limit sign or a stop sign), points-of-interest ("POIs"), and other features or objects.

The collected image data, via one or more media 120, is sent to a map, geographic, and/or navigation data developer, such as NAVTEQ North America, LLC located in Chicago, Ill. For example, a medium 120 may be mailed to or brought to the map developer. Alternatively, some or all of the collected data may be transmitted to the map developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 124 maintained by the map developer receives the collected image data, via the medium 120 or other means. The processing device 124 is one or more computers (such as a desktop tower or a laptop processing unit), processors, or other electronic processing systems or devices. The user interface or workstation 128 includes a display and input devices (such as a keyboard, mouse, voice recognition circuit, or other input device) that are associated with the processing device 124. In one embodiment, the processing device 124 and the user interface 128 are part of the same computer system or workstation. In another embodiment, the processing device 124 and the user interface or workstation 128 are separate computers. For example, the processing device 124 may be a server and the workstation 128 may be a separate computer in communication with the server 124.

The processing device 124 includes, but is not limited to, a processor 144, a memory 148, a geographic recognition software application 152, a data, key, reference, and/or navigation library 156. The processor 144 is a general processor, application-specific integrated circuit ("ASIC"), digital signal processor, field programmable gate array ("FPGA"), digital circuit, analog circuit, or combinations thereof. The processor 144 is one or more processors operable to control and/or communicate with the various electronics and logic of the processing device 124 and/or the user interface or workstation 128. The memory 148 is any known or future storage device. The memory 148 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 148 may be part of the processor 144. The memory 148 is operable or configured to store collected image data and/or other data.

The processor 144 is configured or adapted to execute the geographic recognition software application 152, which may be stored in the memory 148 or other memory. For example, the geographic software application 152 compares features or components (such as invariant components relating to a road sign, road marking, or other geographic features) in or from images to reference features or components in the data library or reference database 156. The data library or template database 156 may be part of the software application 152 and/or may be stored in the memory 148 or other memory. In one embodiment, the geographic recognition software application 152 is used to analyze or perform process operations on a plurality of images collected by the object 112, such as to determine or calculate invariant components (e.g., scale-invariant, rotation-invariant, brightness-invariant, and/or other invariant or independent components) of the images or objects therein. Then, the determined or calculated invariant components are compared with or matched with reference components in the data library 156 to detect or identify a geographic feature, such as a common geographic feature like a speed limit sign or the common text of the speed limit sign, in one or more of the images. Geographic features, such as road or path markings, signs, POIs, and/or other objects, may be detected in the images to enhance or develop the navigation database 132. For example, upon detection or identification of a geographic feature in an image frame, the map developer may store or associate data corresponding to or representing the detected geographic feature in or with the master database 132 or data thereof.

In one embodiment, the geographic database 132 includes data used for navigation-related services. For example, the geographic database 132 contains road segment and node data records that represent a road network, such as the path network 108. A node represents an end point of a road segment. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 132 contains path segment and node data records or other data that represent pedestrian paths in addition to or instead of the vehicle road record data.

The geographic database 132 may be a master geographic database that is stored in a format that facilitates updating, maintenance, and development. For example, the master geographic database 132 or data in the master geographic database 132 is in an Oracle spatial format, such as for development or production purposes. The Oracle spatial format or development/production database may be compiled into a delivery format, such as a GDF format. The data in the production and/or delivery formats may be compiled or further compiled to form geographic database products or databases 140, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

Figure 2:
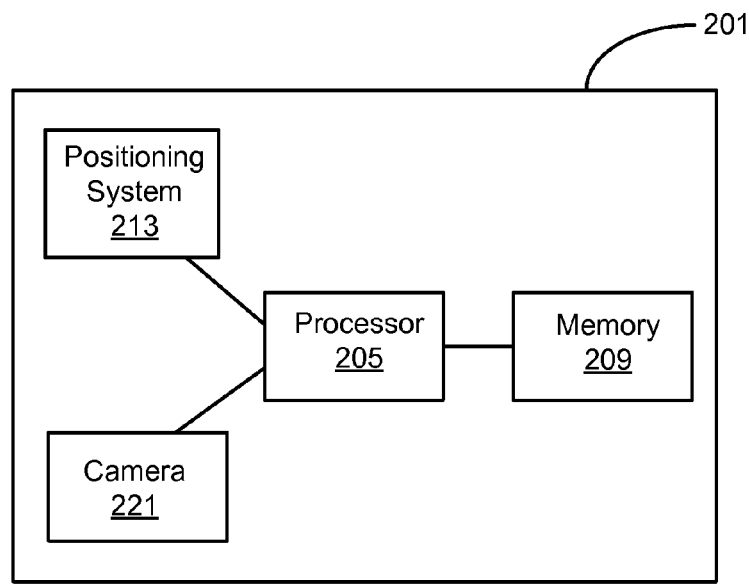
FIG. 2 illustrates components of a device that may be used in the system of FIG. 1.

FIG. 2 illustrates components of a device 201 used in the system 100. For example, the device 201 may be an embodiment of the object 112, such as a vehicle, or may be similar to the supporting device 116. In one embodiment, the device 201 is a support or housing that includes equipment to collect image data. For example, the device 201 is removably or integrally attached or connected to a vehicle. The device 201 is positioned at a top frontend of the vehicle. Alternatively, the device 201 may be positioned on or in any part of the vehicle at any angle.

The device 201 includes, but is not limited to, a processor 205, a memory 209, a positioning system 213, and a camera system or device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. Also, laser devices, such as one or more Light Detection and Ranging ("LIDAR") devices, may be provided. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or another part of the vehicle while the camera system or device 221 is in the device 201.

The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the device 201. The processor 205 is configured to operate the collection equipment, such as the positioning system 213 and the camera system or device 221. For example, the processor 205 sends commands to the various collection devices to collect data and synchronizes or manages the different components. Also, the processor 205 is configured to associate and store data from the collection devices into the memory 209.

The memory 209 is any known or future storage device. The memory 209 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 209 may be part of the processor 205. The memory 209 is operable or configured to store collected image data and/or other data. The memory 209 may be part of the computer-readable medium 120 or may be a separate memory.

The positioning system 213 is a global positioning system ("GPS"), one or more mechanical and/or electrical sensors, one or more gyroscopes, a local positioning system, one or more direction sensors, or other system or device for providing position data, such as location data (e.g., longitude, latitude, altitude, and/or other coordinates) and/or direction data, of the device 201, components thereof, or an attached object, such as a vehicle. The positioning system 213 may include an inertial measurement unit ("IMU"), or the IMU may be separate from the positioning system 213. An IMU may include one or more accelerometers, gyroscopes, and/or other components. For example, the IMU detects current rate of acceleration as well as changes in rotational attributes, such as pitch, roll, and yaw. Data from the IMU may be used for error corrections, data compensation, and other purposes.

The camera system 221 includes one or more cameras used for taking pictures or videos of a surrounding area. For example, the camera system 221 includes a video camera that records video data (such as in the visible light spectrum or other spectrum) representing geographic features of and about a road or path as a vehicle drives along the road or path. The camera system 221 may also capture still photographs separate from the video data. The camera system 221 is able to capture different colors and associated text of geographic features.

Figure 3:
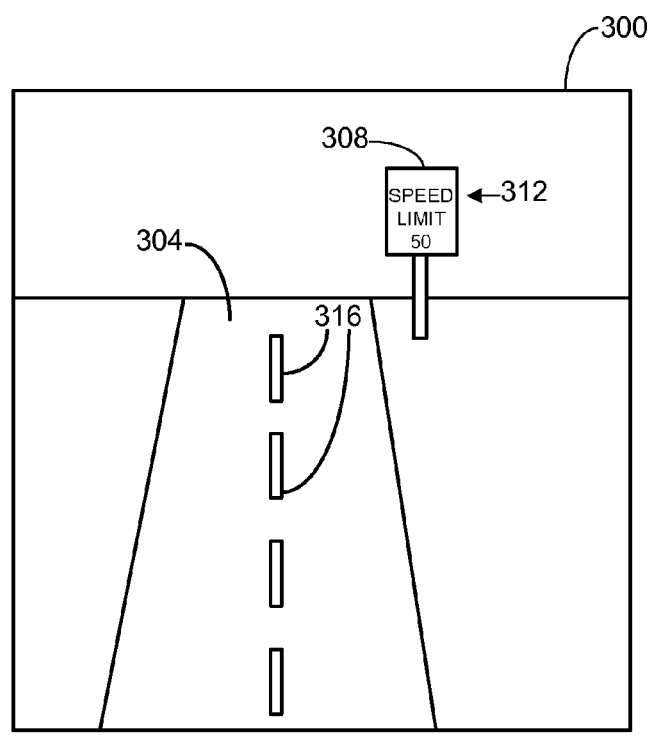
FIG. 3 is an embodiment of an image that illustrates a common geographic feature to be detected.

FIG. 3 is an embodiment of an image 300 that illustrates geographic features or objects, such as a common geographic feature to be detected. A common geographic feature may be an object and/or text pattern thereof that is prevalent in one or more areas, such as common road signs along roads. The image 300 is in a bitmap, JPEG, GIF, and/or other image format. In one embodiment, the image 300 is an image of a plurality of images captured or collected by the camera device 221 or other camera while driving along the road represented in the image 300.

The image 300 includes image representations of various geographic features along or about a road 304. For example, the image 300 includes representations of a common or standard geographic feature, such as a common or standard road sign 308 and/or common or standard text, label, or pattern 312 of the road sign 308. In one embodiment, the common feature is a speed limit sign or the text sequence or pattern SPEED LIMIT. Other common signs or geographic features, such as a stop sign or patterned text (such as STOP), may be provided or exist in the image 300. Also, the image 300 includes lane markings 316 on the road 304. The image 300 is stored, such as in a medium 120, and then sent to the map developer.

Figure 4:
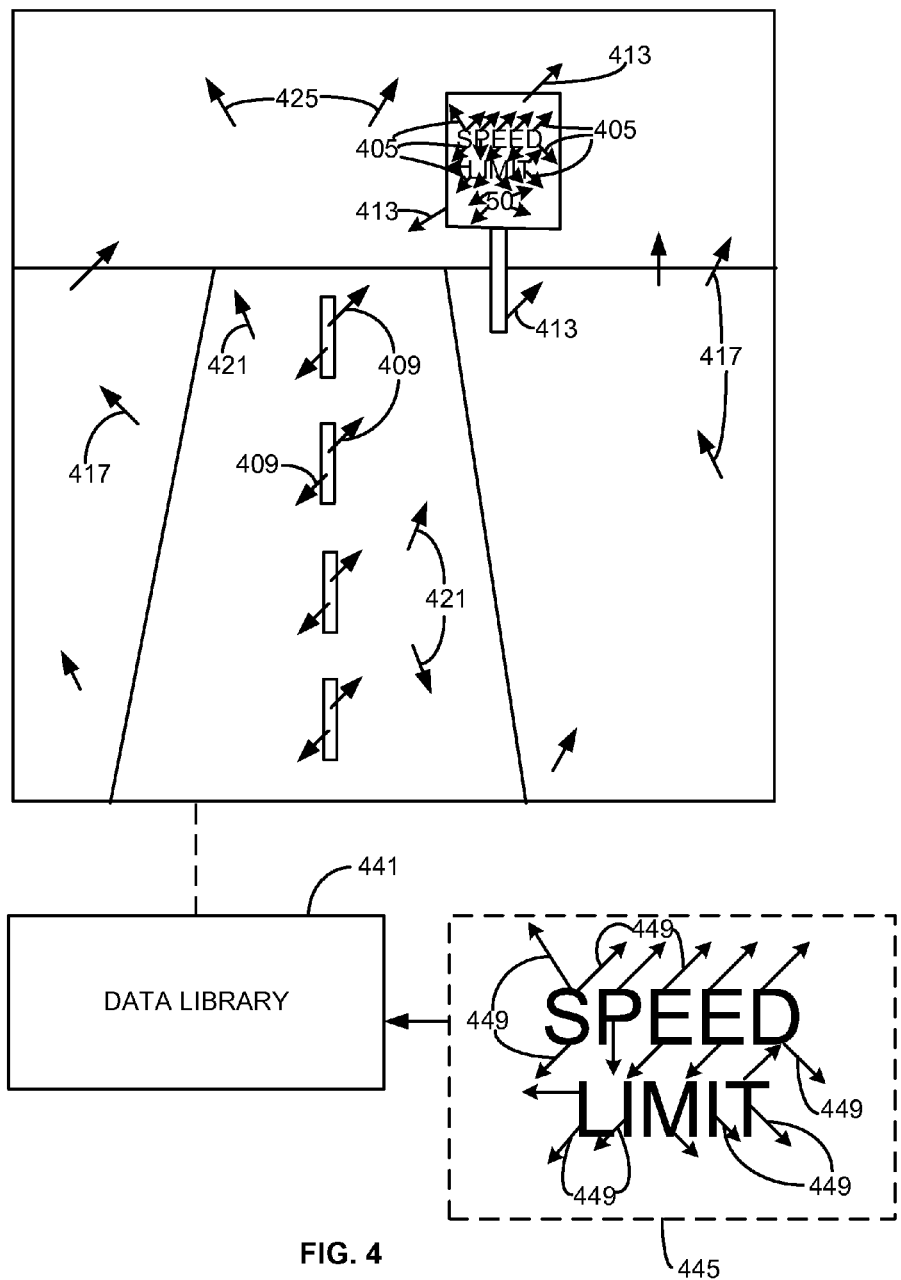
FIG. 4 is an embodiment of a processed image illustrating invariant components and a relationship with a data library.

FIG. 4 is an embodiment of a processed image 401 in relation to a data library 441, such as the data library 156. For example, the processed image 401 is the image 300 that undergoes a process to determine substantially invariant or independent components or features corresponding to geographic objects and/or features thereof in the image. Invariant components or features are points, gradients, vectors, and/or other components of objects or portions thereof in an image that are invariant to scale, rotation, illumination or brightness of the objects or portions thereof. For example, invariant components of an image or objects in the image may be determined by using a scale invariant feature transform ("SIFT") or other invariant component generation techniques or methods.

In one embodiment, for illustrative purposes, invariant or independent components/features of the image 401 are represented by gradient vectors 405, 409, 413, 417, 421, and 425. For example, the invariant components or gradient vectors 405 correspond to or are associated with the text pattern 312 of the common road sign 308. Because the text or label 312 has a distinctive pattern, the corresponding gradient vectors 405 and correspondence between them also have a distinctive pattern or quality. The gradient vectors 409 correspond to the lane markings 316, the gradient vectors 413 correspond to physical parts of the road sign 308, the gradient vectors 417 correspond to a ground area, the gradient vectors 421 correspond to a ground area of the road 304, and the gradient vectors 425 correspond to a sky area or objects therein.

For example, the gradient vectors 405 are invariant components of the common text 312 that are independent or substantially invariant to scale, rotation, and/or brightness of the text pattern or portions thereof. For example, the gradient vectors 405 of the text pattern 312 would be substantially similar to gradient vectors of other images of the text pattern 312 (or similar text patterns), even if the other images are more or less bright, show a different size or scale of the text pattern, and/or show a rotated text pattern, such as rotation in the in-plane. Accordingly, different images including the common label or text pattern 312 (e.g., SPEED LIMIT) or similar text pattern may be analyzed to determine if the image includes the text pattern and/or a sign having the text pattern, like the speed limit sign 308, based on these invariant components.

In one embodiment, the different invariant components or gradient vectors corresponding to the image 401 are compared or matched with reference components 449. For example, the reference components 449 are invariant components or gradient vectors corresponding to a reference text pattern 445 that is substantially the same as or similar to the text pattern 312. The reference text label 445 may be an image of a sign or text thereof that is processed (such as using SIFT or other techniques used for the image 401) to determine the invariant components 449, and the components 449 are saved or stored in the data library as reference components. Accordingly, different determined invariant components of various images may be matched or compared to the reference components 449 to determine or identify a desired common geographic feature (such as the sign 308 and/or text pattern 312 thereof) in one or more of the various images, even if the rotation, scale, and/or illumination of the images or objects therein differ. For example, after or while comparing the gradient vectors or invariant components corresponding to the image 401 to the data library 441, it is determined that the image 401 includes a common geographic feature (such as a speed limit sign) based on a match with the reference invariant components 449. Then, the image 401 may be identified to a map developer as an image including a speed limit sign or desired common feature to enhance or develop a navigation or map database, such as the database 132.

Figure 5:
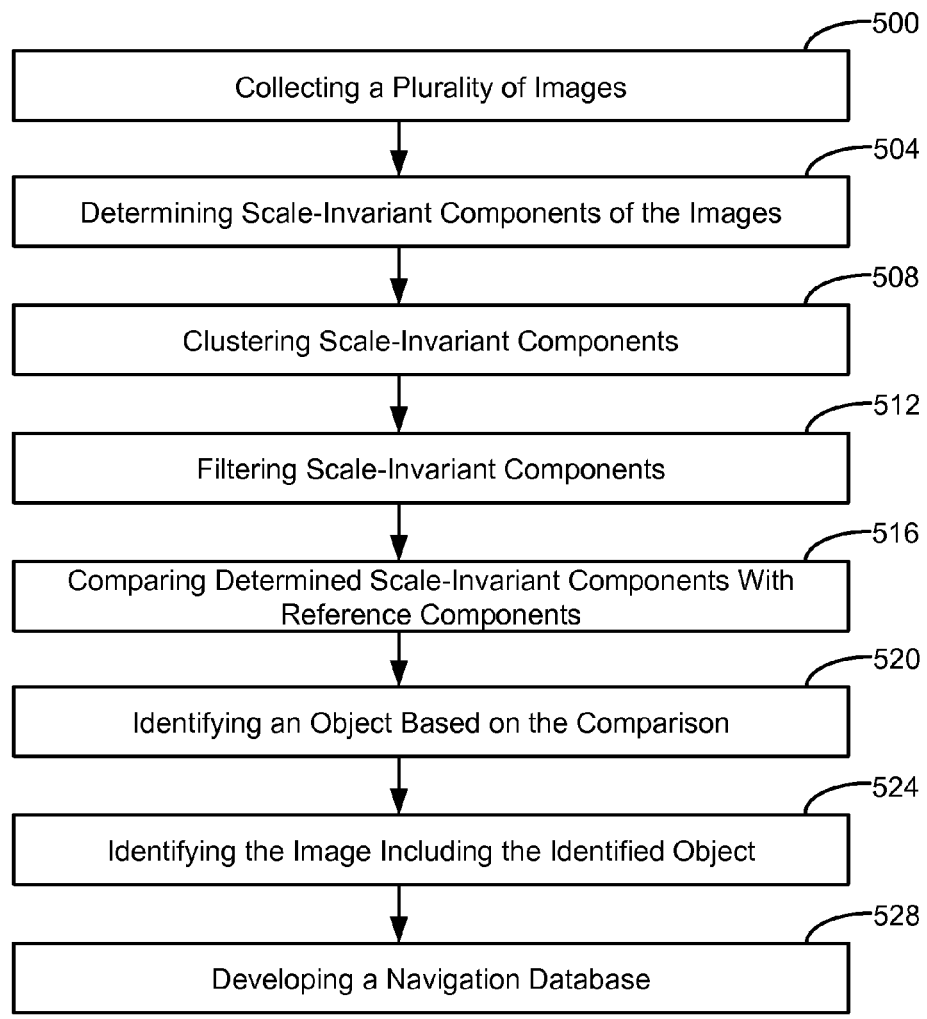
FIG. 5 is a flowchart of a method for detecting a common geographic feature in images, such as the image of FIG. 3.

FIG. 5 is a flowchart of a method for detecting, determining, or identifying a common geographic feature, such as the road sign 308 or common text pattern 312 thereof, in images. Fewer or more steps or acts may be provided, and a combination of steps may be provided. Also, the steps or acts may be performed in the order as shown or in a different order. The method is implemented by the system and/or devices described herein or by different devices or systems. Also, the detection process may be fully automated via data processing.

A plurality of images of geographic features are captured or collected by a camera, such as the camera system 221 (Step 500). For example, the map developer employs a driver to drive a vehicle, such as the object 112, on one or more roads to collect data to develop the map database 132. In one embodiment, image data, such as photographs and/or videos, of geographic features or areas about roads or paths are collected. Other data including positioning information or data, such a GPS data (e.g., latitude, longitude, and/or altitude) corresponding to the vehicle or data collection devices supported by the vehicle are collected. In an alternate embodiment, instead of or in addition to driving or riding a vehicle to collect images, a pedestrian may use a supporting device, such as the device 116 or 201, to collect the image data and/or other data. For example, a pedestrian carries or puts on a backpack or other transportation device (which may support the device 116 or 201) while walking on a path to collect data corresponding to the path.

The captured or collected images and/or other data are sent to a map developer. In one embodiment, the image data is associated with position data and/or other data, and all the data is sent in the same data file. Or, different data is sent separately with links or indicators associating the different data with each other. In one embodiment, images, such as the image 300, are stored on a computer-readable medium, such as the medium 120, and other collected data are stored on different media. Alternatively, different types of collected data may be stored on the same computer-readable medium. The computer-readable media are delivered to an office or facility of the map developer. For example, after a vehicle is finished collecting data, it returns to a facility of the map developer. Or, the media may be mailed or sent by carrier to a certain office or facility. Alternatively, the collected data is transmitted to the map developer via a wireless or wired network.

The images and/or other data are received by a processing device of the map developer, such as the processing device 124. Some or all of the collected or received images are analyzed or processed to determine or generate invariant data components, such as scale-invariant components that may be similar to the components 405, 409, 413, 417, 421, and 425, of the images (Step 504). In one embodiment, an image, such as the image 300, from the plurality of collected or captured images is selected. Then, a process, algorithm, and/or methodology to determine invariant components is applied to the selected image. For example, the process or algorithm may be implemented by the geographic recognition software application 152.

In one embodiment, SIFT is used to determine scale-invariant features or data components of the selected image. For example, initially, the image, such as the image 300, is used to produce a plurality of difference images. Difference images are produced by successively blurring the image to produce a blurred image and then subtracting the blurred image from the initial image resulting in a difference image. Blurring may involve two one-dimensional Gaussian function convolutions in the horizontal and vertical directions.

Various difference images at different levels are produced to determine components or features that are invariant or substantially invariant to scale of objects in images. For example, amplitude extrema, such as pixel amplitude extrema, are located or identified in each difference image. In one embodiment, an amplitude, such as an amplitude value, of a pixel is compared to amplitudes of neighboring pixels, such as eight neighboring pixels. The comparison determines whether or not the pixel has an amplitude greater than or less than all of its neighbors. Each pixel of each difference image is considered to determine whether such pixel represents a maximum or minimum relative to its neighbors in its own level as well as in adjacent levels. The extremum point or pixel is a scale-invariant component or feature of the image. For example, if the extremum point corresponds to an object in an image, then the extremum point will be substantially the same for other images including that object or similar objects even if the images or objects within are at different scales or sizes.

Figure 6:
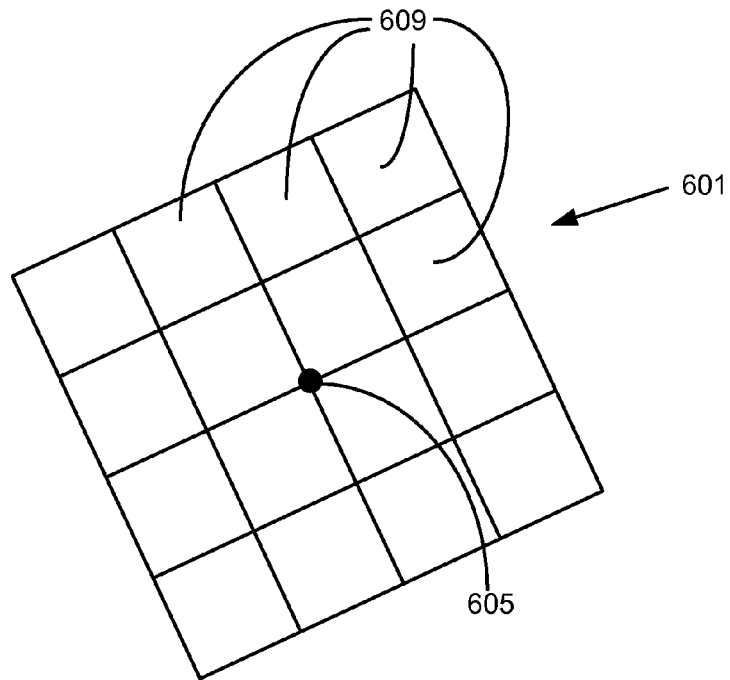
FIG. 6 illustrates an invariant component and/or a process step to determine an invariant component of the method of FIG. 5.

Once an extremum point or pixel is determined, its location is stored for further processing. FIG. 6 shows a scale-invariant component or extremum point 605 in a region 601. For example, the region 601 is defined as a plurality of locations that are arranged in an orientation about the extremum point 605. The region 601 can be any size and may depend on a desired resolution. In one embodiment, 16 subregions 609 are defined in which each subregion includes 16 pixels in a 4×4 format. Accordingly, the region 601 corresponds to a 16×16 pixel grid.

The extremum point 605 in the region 601 may be represented by different angular orientations. For example, eight orientation ranges may be specified. Elements of the different angular component sets may have a one to one correspondence with respective subregions 609, and the elements may act as component descriptors. The angular component sets and their associated descriptor components are then stored. In one embodiment, the angular component sets and descriptor components are used as rotation independent or invariant identifiers of the extremum point 605. For example, if the extremum point 605 corresponds to an object in an image, then the extremum point 605 may be matched to substantially similar extremum points of other images including the object or similar object even if the images or objects within are rotated or are at different in-plane angles, based on the angular component sets and descriptor components.

A gradient vector, such as the gradient vectors 405, 409, 413, 417, 421, and 425, about the extremum point 605 is generated. In one embodiment, pixels around the extremum point 605 have vectors pointing in various orientations, and the vectors are added together to produce a resultant vector, the angle of which corresponds to the extremum orientation. The gradient vector is a 128 element vector including information about the eight sets of component subregion descriptors, neighborhood information, and other identifiers. The gradient vector or components thereof may be substantially invariant or independent to brightness or illumination. For example, if the extremum point 605 or gradient vector corresponds to an object in an image, then the extremum point or gradient vector will be substantially the same for other images including that object or similar object even if the images or objects are at different illumination or brightness levels because difference or gradient components are being analyzed.

Accordingly, the gradient vector is substantially invariant to scale, rotation, and brightness or illumination. Further description and details on the process of determining invariant components of images or objects therein, such as using SIFT, may be provided in the U.S. Pat. No. 6,711,293, entitled METHOD AND APPARATUS FOR IDENTIFYING SCALE INVARIANT FEATURES IN AN IMAGE AND USE OF SAME FOR LOCATING AN OBJECT IN AN IMAGE, which is hereby incorporated by reference. Other scale-invariant, rotation-invariant, and/or brightness-invariant components or data components may be determined using other techniques or methods that may be similar to or different than SIFT.

After determining the invariant components of the image, the invariant components may be clustered (Step 508). For example, each of the substantially invariant components, such as the gradient vectors 405, 409, 413, 417, 421, and 425, may be analyzed to determine if they are close to other invariant components using any clustering technique. Based on predetermined or selected spacing requirements, invariant components that are not close to other invariant components may be filtered out (Step 512). The number of invariant components in different groupings may be taken into consideration when determining which components to filter out. For example, two invariant components may be close to each other, but may be filtered out because they are not relatively close to any other invariant components. Accordingly, outlier components may be eliminated. Also, invariant components that are not located in a desired area, such as above or by a side of the road (e.g., where a road sign may be), may be eliminated or filtered based on the clustering.

The determined invariant components, such as the remaining components, of the image are compared or matched with reference invariant components (Step 516). In one embodiment, the gradient vectors corresponding to the image 401 are compared to the reference invariant components or gradient vectors 449 in a data or reference library, such as the data library 441. The comparison involves matching gradient vectors as well as comparing correspondence of neighboring gradient vectors. A matching threshold or level may be used. Because of the unique correspondence between the gradient vectors 449 (due to the text pattern of the road sign), the matching of the gradient vectors 405 of the image 401 and the reference gradient vectors 449 is facilitated. Because invariant components or gradient vectors are being compared, the scale, rotation, and/or brightness of the text pattern 312, common road sign 308, or the image 300 do not substantially matter.

Accordingly, a common geographic object in an image, such as the sign 308 and/or text pattern 312 thereof, is identified or determined based on the comparison or matching with the reference invariant components (Step 520). In one embodiment, in addition to or instead of clustering and filtering (such as in Steps 508 and 512) before the comparison, matched invariant components are clustered and non-matched components are filtered out to help identify geographic objects (such as to minimize false positives). For example, a matched cluster in an elevated area is more likely to be associated with a road sign than a matched cluster on a ground area. Also, to further reduce false positives, color information may be used as a constraint. For example, knowing that all speed limit signs in the U.S. have a white background and all stop signs in the U.S. have a red background, one can use these color restraints to further match or identify desired common road signs.

Figure 7:
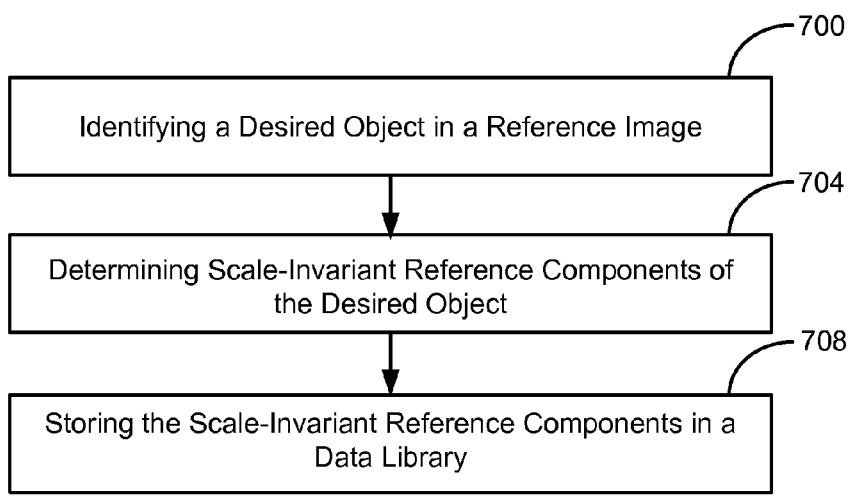
FIG. 7 is a flowchart of a method for determining reference components related to the method of FIG. 5.

FIG. 7 is a flowchart of a method for determining reference invariant components, such as the gradient vectors 449. In one embodiment, a desired geographic object, such as a speed limit sign or text thereof (e.g., similar to the sign 308 or pattern 312) or other common geographic feature in a reference image is identified (Step 700). For example, a map developer uses one of the images collected by the object 112 or other image to find the desired common object. Then, a process or algorithm to determine substantially invariant components is applied on the desired common object to determine invariant components thereof (Step 704). SIFT or other techniques used in Step 504 may be utilized. The determined invariant reference components are stored or saved in a data or reference library, such as the data library 156 or 441 (Step 708). The determination of the reference invariant components may occur before or after collecting the plurality of images by the object 112.

Referring back to FIG. 5, after the common geographic object, such as the road sign 308 and/or text pattern 312, is identified or determined to be included in the image, the image, such as the image 300, or image frame itself is identified (Step 524). In one embodiment, a text file is generated that includes an identifier of the image or image frame including the road sign 308. The identifier information may include geographic position information, such as the real-world coordinates associated with the image. The real-world coordinates may be a latitude, longitude, and/or altitude collected by the object 112 or 201, such as via the positioning system 213, when the image or image frame was taken or captured. The text file or other identification information may be sent to the map developer (such as employed personnel or computer/processor).

Upon receiving the identification information, such as the text file, a navigation or map database, such as the database 132, or data thereof, may be developed or enhanced (Step 528). In one embodiment, the map developer reads or views the text file or identification information. Based on the identification information, the map developer becomes aware of where certain geographic features, such as common geographic features (e.g., speed limits signs or other common road signs or features having a standard text pattern), are located without going through images frame-by-frame. The map developer may review the images identified for verification. Also, in the case of speed limit signs, the map developer may view or read the identified images to determine the actual speed limit value (e.g., 50 MPH). Because the map developer knows where certain or desired geographic objects are located, data representing the geographic objects may be entered, inputted, or stored in the navigation database 132. For example, the map developer may generate data representing or signifying a common road sign and store that data in a road or path segment or node record that represents that real-world portion of the road, path, or area that includes the road sign. Accordingly, when data corresponding to the road segment record is accessed, such as by a navigation system or a modeling device, the data of the road sign is accessed for navigation-related services, modeling, or other purposes. Alternatively, the data of the road sign may be stored separately from path/road segment or node records (e.g., an index may be used to associate or link the data with appropriate nodes, segments, and/or other map data structures or layers). Also, the data corresponding to the road sign may be stored in a database separate from the navigation database 132.

The development or enhancement steps, such as reading or identifying information and generating and storing data or a data model may be an automated and/or manual process.

The processes above may be performed on all or some of the images collected by the object 112. For example, every image collected is analyzed to determine if it includes a certain geographic object, such as a common road sign or text sequence thereof. Alternatively, images taken at different times are sampled. In one embodiment, if an image or image frame is determined to include a certain geographic object, the adjacent images or image frames (e.g., image frames close in time) that most likely would contain the same geographic object (such as at different scales or angles) are skipped or not considered.

The different steps, acts, or processes of the methods described herein may be mixed and matched. Also, the methods mentioned herein may be implemented by a computer application, such as the geographic recognition software application 152, that is executed by one or more processors, such as the processor 144.

Experimental results, using the methods above, are shown below:

| | |
|---|---|
| Total number of frames in the video | 6,096 |
| Number of speed limit signs | 23 |
| Number of signs correctly detected | 23 |
| Number of false positives | 4 |

The results are based on a test implemented in Matlab and C on a Pentium 4 PC with a 3.0 GHz CPU and 2.0 GB of RAM. The video was collected by driving from Chicago, Ill. to Naperville, Ill., in which a camera was mounted on the vehicle facing approximately 30 degrees to the right of the driving direction. The camera had a frame rate of 1 frame per 5 meters and was synchronized with GPS.

Alternatives

As mentioned above, the processing of the collected image data and/or other data may occur in a processing device at a map developer facility. Alternatively, some or all of the processing of the collected data may occur in the object collecting the data or components thereof, such as the vehicle or collection devices supporting the vehicle. Semi-processed or full processed data may then be sent to or transmitted to the map developer for further processing and/or storage in the map database.

As described above, substantially invariant components are determined for collected images. However, certain areas of those images may be focused on rather than generating invariant components for the entire image. For example, if one is interested in identifying common geographic features like common road signs, one can crop or eliminate a portion, such as bottom or ground portions, of images that may correspond to geographic areas not associated with road signs. Or, the program may select certain portions or areas (such as elevated areas and/or side regions) within an image to perform invariant component processes, such as SIFT. For example, a photogrammetric constraint/approach may be used. Also, the desired portions or areas may be selected by the map developer based on a boundary input.

Gradient vectors were described as invariant components to be matched to determine or identify geographic objects, such as common road signs or standard text pattern thereof. Alternatively, other invariant components may be used to match or compare. For example, extrema points or associated region descriptors may be used. Gradient vectors are used because they provide a plurality of distinctive information, such as 128 elements, which makes it easier to compare, but other components or subcomponents may be used.

The embodiment described above focuses on detecting common road signs or text thereof, such as speed limit signs or the text SPEED LIMIT. However, other common geographic features may be detected. For example, the more distinctive or patterned a feature, the easier it becomes to match the invariant components thereof due to correspondence with the pattern. Other distinctive text patterns or objects may include path or road markings (e.g., on a ground surface), informational markings, markings within lanes, other path or road signs like stop signs or expressway signs that have a common text pattern (such as EXIT), and/or other geographic features.

Furthermore, instead of or in addition to focusing on a common text pattern or sequence, other features of a geographic object, such as a road sign, may be used. In one embodiment, common shapes of geographic features/objects may be used in matching invariant components to detect a desired geographic object in an image. For example, the common shape of a stop sign (octagon) or a speed limit sign (specified rectangle) and/or corresponding invariant components may be used to detect a stop sign or speed limit sign in an image. Also, a common icon or symbol, such as a symbol in a road sign, may be used in matching invariant components to detect the symbol and/or the geographic object including the symbol in an image.

Also, in addition to or instead of sending a text file as identification of an image or image frame determined to include a desired geographic object, a highlighted image may be used. For example, when a desired geographic object is detected in an image via the invariant components, the portion of the image or a copy thereof corresponding to the desired geographic object is highlighted, and the highlighted image or image copy is sent to the map developer, such as via an image file. In one embodiment, because the matched invariant components in the image correspond to the desired geographic object, the position of the matched invariant components (relative to the rest of the image) is used to determine what part of the image or copy thereof to highlight. For example, a detected road sign or text pattern/symbol thereof, a portion of the road sign or text pattern/symbol thereof, or an area around or about the road sign or text pattern/symbol thereof in the image is highlighted. Different colors and/or brightness levels may be used to highlight a geographic object or area thereof. Also, one or more markings may be used to highlight or bring attention to an object or area.

The invariant components described above are substantially invariant to rotation in the in-plane. Also, due to the nature of the invariant components, they are also partially invariant to out of plane rotation. However, if the out of plane rotation is too much in degree, then the invariant qualities may be diminished. To make the system and processes above more robust to out of plane rotation, images of a geographic object (like a road sign) may be taken at different out of plane angles or images of an object rotated at different out of plane angles may be taken. Then, invariant components of the images or object therein may be generated at the different out of plane angles and stored in the data library as reference components. Alternatively, warping or other techniques may be used to generate data components that are substantially invariant to out of plane rotation.

Furthermore, as described above, the collection of images occurs about or around roads or paths. In an alternate embodiment, images may be collected in any region or area, such as areas not associated with predetermined or fixed paths or roads. For example, images may be collected over different parts of an open area having no set paths.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A method of detecting a common road sign from collected images to develop a master navigation database, the method comprising:
    collecting a plurality of images of geographic areas along a road;
    selecting an image of the plurality of images;
    applying an image area restraint that constrains an allowable area of the selected image for identification of object components to an elevated area of the selected image;
    determining components that correspond to an object about the road in the allowable area of the selected image, the determined components being independent to scale of the object;
    comparing the determined components to reference components in a data library;
    when, based on the comparison, the determined components substantially meet a matching threshold with the reference components, identifying the object in the selected image to be a common text pattern of a common road sign corresponding to the reference components in the data library;
    modifying a path segment attribute for the road in the master navigation database to include an association with the common road sign based on the identified common text pattern of the common road sign; and
    providing a navigation service from the master navigation database according to the modified attribute of the path segment.

2. The method of claim 1, wherein the common text pattern comprises letters spelling SPEED LIMIT or STOP.

3. The method of claim 1, wherein the determined components are substantially independent to brightness of the object.

4. The method of claim 1, wherein the determined components are substantially independent to rotation of the object.

5. The method of claim 1, further comprising:
    identifying a desired common road sign text pattern in a reference image of the plurality of images;
    determining the reference components that represent the desired common road sign text pattern in the reference image, the reference components being independent to scale and to rotation of the desired common road sign text pattern; and
    storing the reference components in the data library.

6. The method of claim 1, wherein determining the components that correspond to the object about the road comprises using a scale-invariant feature transform.

7. The method of claim 1, wherein determining the components that correspond to the object comprises:
    determining components that are independent to scale for the entire selected image;
    identifying the determined components that correspond to the object in an area about the road based on clustering; and
    filtering out the components not part of the identified cluster.

8. The method of claim 1, wherein the selected image further comprises data indicating a geographic position of acquisition of the image, and the path segment having the modified attribute for the road is associated with the geographic position in the master navigation database.

9. The method of claim 1, wherein the comparing further comprises:
    applying a color restraint to the desired road object based on a color restraint associated with the reference invariant features.

10. A method of detecting a standard road object in an image, the method comprising:
    capturing a plurality of images along roads, the plurality of images captured via a camera mounted on a vehicle;
    applying an image area restraint to the plurality of images that constrains an allowable area of the images for identification of object components to an elevated area of the images;
    determining scale-invariant features of each of the plurality of images in the allowable area, the scale-invariant features determined as a function of a scale-invariant feature transform;
    comparing the determined scale-invariant features with reference scale-invariant features to determine whether a desired road object is included in at least one of the plurality of images, the reference invariant features corresponding to the desired road object;
    identifying at least one of the plurality of images determined to include the desired road object as a function of the comparison between the determined scale-invariant features and the reference scale-invariant features, the desired road object including a standard label pattern;

modifying a path segment attribute or node attribute in a navigation database to include an association with the desired road object including the standard label pattern; and providing a navigation service from the navigation database according to the modified attribute.

11. The method of claim 10, wherein the desired road object comprises a speed limit sign.

12. The method of claim 10, wherein the desired road object comprises a stop sign.

13. The method of claim 10, wherein the reference scale-invariant features correspond to different points along text of the standard label pattern.

14. The method of claim 10, wherein the determined scale-invariant features comprise amplitude extrema points.

15. The method of claim 10, wherein the determined scale-invariant features comprise gradient vectors.

16. The method of claim 10, further comprising:
developing a navigation database based on identifying the at least one of the plurality of images determined to include the desired road object.

17. The method of claim 10, wherein the standard label pattern includes the common text pattern and the common road sign.

18. A method comprising:
capturing a plurality of images along roads, the plurality of images captured via a camera mounted on a vehicle;

applying an image area restraint to the plurality of images that constrains an allowable area of the images for identification of scale invariant features to an elevated area of the images;

determining scale-invariant features of each of the plurality of images within the allowable area, the scale-invariant features determined as a function of a scale-invariant feature transform;

comparing the determined scale-invariant features with reference scale-invariant features to determine whether a desired road object is included in at least one of the plurality of images, the reference invariant features corresponding to the desired road object;

identifying at least one of the plurality of images determined to include the desired road object as a function of the comparison between the determined scale-invariant features and the reference scale-invariant features, the desired road object including a standard label pattern indicating a speed limit;

assigning the speed limit to a path segment in a navigation database according to the desired road object including the standard label pattern indicating the speed limit; and providing a navigation service from the navigation database according to the standard label pattern indicating the speed limit.

* * * * *